United States Patent
He et al.

(10) Patent No.: US 12,451,161 B2
(45) Date of Patent: Oct. 21, 2025

(54) METHOD, DEVICE, STORAGE MEDIUM AND COMPUTER PROGRAM PRODUCT FOR VIDEO PROCESSING

(71) Applicant: BEIJING ZITIAO NETWORK TECHNOLOGY CO., LTD., Beijing (CN)

(72) Inventors: Wozhou He, Beijing (CN); Gen Li, Beijing (CN); Xinglong Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/566,180

(22) PCT Filed: Jun. 1, 2022

(86) PCT No.: PCT/CN2022/096646
§ 371 (c)(1),
(2) Date: Dec. 1, 2023

(87) PCT Pub. No.: WO2022/253276
PCT Pub. Date: Dec. 8, 2022

(65) Prior Publication Data
US 2024/0249752 A1  Jul. 25, 2024

(30) Foreign Application Priority Data
Jun. 1, 2021 (CN) .......................... 202110610952.5

(51) Int. Cl.
*G11B 27/031* (2006.01)
*G06T 5/60* (2024.01)
(Continued)

(52) U.S. Cl.
CPC .............. *G11B 27/031* (2013.01); *G06T 5/60* (2024.01); *G06T 5/70* (2024.01); *G06T 7/20* (2013.01);
(Continued)

(58) Field of Classification Search
CPC ....... G11B 27/031; G11B 27/005; G06T 5/60; G06T 5/70; G06T 7/20;
(Continued)

(56) References Cited

U.S. PATENT DOCUMENTS

| | | | |
|---|---|---|---|
| 7,127,127 B2 | 10/2006 | Jojic et al. | |
| 2013/0343727 A1 | 12/2013 | Rav-Acha et al. | |
| 2019/0268632 A1* | 8/2019 | Foerster | H04N 21/44213 |

FOREIGN PATENT DOCUMENTS

| | | |
|---|---|---|
| CN | 102271280 A | 12/2011 |
| CN | 104506947 A | 4/2015 |

(Continued)

OTHER PUBLICATIONS

International Search Report and Written Opinion issued in PCT/CN2022/096646, dated Jul. 27, 2022, 13 pages provided, with English translation.

(Continued)

*Primary Examiner* — Girumsew Wendmagegn
(74) *Attorney, Agent, or Firm* — Astute IP Law Group

(57) ABSTRACT

A method, device, storage medium, and computer program product of video processing are provided in embodiments of the disclosure, by obtaining an initial video segment; inputting the initial video segment into a machine learning model and determining a speed variation rate of the initial video segment based on an output result of the machine learning model; wherein the machine learning model has been trained based on a sample video segment labeled with the speed variation rate; and varying a speed of the initial video (Continued)

segment based on the speed variation rate to obtain a target video segment. Embodiments of the present disclosure apply artificial intelligence to determine the speed variation rate of an initial video segment by a machine learning model to reduce the dependence on the user's editing experience, increase the density of the video information, and increase the number of overall playing of the released video.

17 Claims, 4 Drawing Sheets

(51) Int. Cl.
*G06T 5/70* (2024.01)
*G06T 7/20* (2017.01)
*G11B 27/00* (2006.01)

(52) U.S. Cl.
CPC .. *G11B 27/005* (2013.01); *G06T 2207/10016* (2013.01); *G06T 2207/20021* (2013.01); *G06T 2207/20081* (2013.01); *G06T 2207/20084* (2013.01)

(58) Field of Classification Search
CPC . G06T 2207/10016; G06T 2207/20021; G06T 2207/20081; G06T 2207/20084; G06N 20/00; H04N 21/44; H04N 21/4402; H04N 21/472; H04N 21/845; H04N 21/440281; H04N 21/47205; H04N 21/8456
See application file for complete search history.

(56) References Cited

FOREIGN PATENT DOCUMENTS

| | | | |
|---|---|---|---|
| CN | 104735385 | A | 6/2015 |
| CN | 108401193 | A | 8/2018 |
| CN | 109451248 | A | 3/2019 |
| CN | 110730387 | A | 1/2020 |
| CN | 110856042 | A | 2/2020 |
| CN | 108184169 | A | 10/2020 |
| CN | 111771384 | A | 10/2020 |
| CN | 112653920 | A | 4/2021 |
| CN | 112822546 | A | 5/2021 |

OTHER PUBLICATIONS

Office Action issued in Chinese Application No. 202110610952.5, dated Jun. 17, 2023, with machine translation.
Cheng et al., "A method of generating trick files from TS stream file", vol. 5, No. 1, May 11, 2016, 7 pages, with English Abstract.
Chiu et al., "A Study of Video Buffering Mechanisms and Playing Speed Tuning Techniques", 2017 3rd IEEE International Conference on Computer and Communications (ICCC), Mar. 26, 2018, 5 pages.
Notification to Grant Patent Right for Invention for Chinese Patent Application No. 202110610952.5, mailed on Feb. 21, 2024, 7 pages.
Lele Dong, "The Technology of Smart Quick Browsing Based on Key-frame Extraction", CNKI, Jun. 15, 2018, 55 pages, with English Abstract.

* cited by examiner

METHOD, DEVICE, STORAGE MEDIUM AND COMPUTER PROGRAM PRODUCT FOR VIDEO PROCESSING

CROSS REFERENCE

The present application claims priority to Chinese Patent Application No. 202110610952.5 filed on Jun. 1, 2021 and entitled "METHOD, DEVICE, STORAGE MEDIUM AND COMPUTER PROGRAM PRODUCT FOR VIDEO PROCESSING", the entirety of which is incorporated herein by reference.

FIELD

Embodiments of the present disclosure generally relate to the technical field of computer and network communication, and specifically, to a method, device, storage medium, and computer program product for video processing.

BACKGROUND

Video speed variation is a commonly used means of video editing, in the process of video editing, users can select a segment of the video material, manually conduct a regular speed variation of a certain speed variation rate on the video segment or formulate a curve speed variation of the curve shape.

However, manually conducting video speed variation editing often requires the user to have a certain degree of experience, and the inexperienced user may try several times to determine a relatively appropriate speed variation effect, and the efficiency of the user in determining the speed variation rate is low, and the speed variation rate determined finally may not achieve the optimal speed variation effect so that the final obtained video has poor expressive ability.

SUMMARY

Embodiments of the present disclosure provide a method, device, storage medium, and computer program product of video processing to accurately determine a speed variation rate of a video segment, implement intelligent speed variation of the video, simplify user operation, not require the user to have editing experience, and improve video presentation capability.

In a first aspect, embodiments of the present disclosure provide a method of video processing, comprising:
  obtaining an initial video segment;
  inputting the initial video segment into a machine learning model and determining a speed variation rate of the initial video segment based on an output result of the machine learning model; wherein the machine learning model has been trained based on a sample video segment labeled with the speed variation rate; and
  varying a speed of the initial video segment based on the speed variation rate to obtain a target video segment.

In a second aspect, embodiments of the present disclosure provide a method of model training, comprising:
  obtaining a plurality of training data items; the training data item comprising the sample video segment labeled with the speed variation rate; and
  training an initial model of the machine learning model based on the training data, to obtain a trained machine learning model.

In a third aspect, embodiments of the present disclosure provide a device of video processing, comprising:

an obtaining unit, configured to obtain an initial video segment;
  a processing unit, configured to input the initial video segment into a machine learning model and determine a speed variation rate of the initial video segment based on an output result of the machine learning model; wherein the machine learning model has been trained based on a sample video segment labeled with the speed variation rate; and
  a speed-varying unit, configured to vary a speed of the initial video segment based on the speed variation rate to obtain a target video segment.

In a fourth aspect, embodiments of the present disclosure provide a device of model training, comprising:
  an obtaining unit, configured to obtain a plurality of training data items; the training data item comprising the sample video segment labeled with the speed variation rate; and
  a training unit, configured to obtain an initial model of the machine learning model based on the training data, to obtain a trained machine learning model.

In a fifth aspect, embodiments of the present disclosure provide an electronic device comprising: at least one processor and memory; and
  the memory storing computer-executable instructions;
  the computer-executable instructions, when executed by at least one processor, causing the at least one processor to execute the methods described in the first and second aspects, and various possible designs of the first and second aspects.

In a sixth aspect, embodiments of the present disclosure provide a computer-readable storage medium storing computer-executable instructions, the computer-executable instructions, when executed by a processor, implementing the methods described in the first aspect, the second aspect and the various possible designs of the first aspect and the second aspect is realized.

In a seventh aspect, embodiments of the present disclosure provide a computer program product comprising a computer program, the computer program, when executed by a processor, implementing the methods described in the first aspect, the second aspect, and various possible designs of the first aspect and the second aspect.

In an eighth aspect, embodiments of the present disclosure provide a computer program that, when executed by a processor, implements the methods described in the first aspect, the second aspect, and the various possible designs of the first aspect and the second aspect.

A method, device, storage medium, and computer program product of video processing are provided in embodiments of the present disclosure, by obtaining an initial video segment; inputting the initial video segment into a machine learning model, and determining a speed variation rate of the initial video segment based on an output result of the machine learning model; wherein the machine learning model has been trained based on a sample video segment labeled with the speed variation rate; and varying a speed of the initial video segment based on the speed variation rate to obtain a target video segment. Embodiments of the present disclosure apply artificial intelligence to determine the speed variation rate of an initial video segment by means of a machine learning model to reduce the dependence on the user's editing experience, simplify the user's operation, improve the processing efficiency, reduce the cost of manpower, and effectively improve the video performance capability, reasonably increase the density of the video information, and increase the number of overall playing of the released video.

BRIEF DESCRIPTION OF THE DRAWINGS

In order to make the embodiment of the present disclosure or the technical solution of prior art clearer, the accompanying drawings used in the embodiment of the present disclosure, or the technical solution of prior art will be described briefly. Obviously, the described drawings are the embodiments of the present disclosure, to ordinary skill in the art, other drawings can further be obtained based on the following drawings without creative labor.

DETAILED DESCRIPTION

Figure 1:
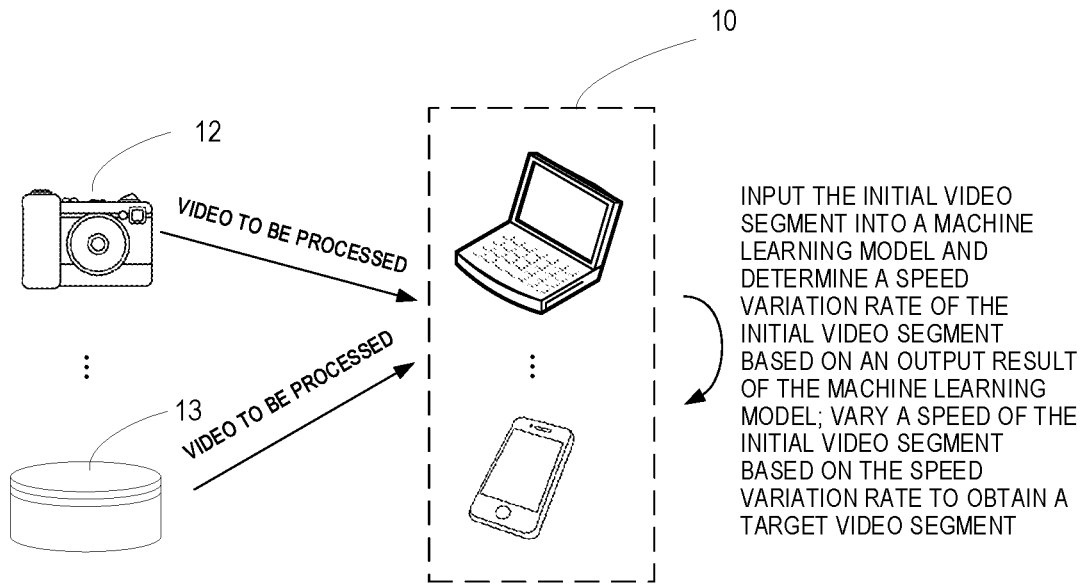
FIG. 1 shows an example diagram of an application scenario of a method of video processing provided by embodiments of the present disclosure.

In order to make the purpose, technical solution, and advantages of the embodiment of the present disclosure clearer, embodiments of the present disclosure of the present disclosure will be described clearly and completely in the following in conjunction with the accompanying drawings. Obviously, the described embodiments are a part of the embodiments of the present disclosure, not all the embodiments. Based on the embodiments of the present disclosure, all other embodiments obtained by ordinary skill in the art without creative labor fall within the scope of protection of the present disclosure.

In the prior art, in the process of video editing, it is usually necessary for the user to select a segment of the video material, and manually conduct a regular speed variation of a certain speed variation rate on the video segment, or formulate a curve speed variation of the curve shape, i.e., the speed variation rate presents a curved distribution, in which the speed variation rate is usually greater than 1.0 for acceleration, and is less than 1.0 for deceleration.

However, the prior art of manually conducting speed variation editing of videos often requires a degree of experience, and the user may try a plurality of times in order to determine an appropriate speed variation rate and achieve an appropriate speed variation effect. Moreover, the efficiency of the user in determining the speed variation rate is relatively low. In the case of longer video materials, the user is required to manually set the speed variation rate one paragraph by one paragraph, which consumes a large amount of labor and time costs, and the finalized speed variation rate may not achieve the optimal speed variation effect, making the final video performance capability poor. In particular, it is impossible to improve the information density of the video and increase the number of overall playing (Video View, or VV for short, refers to the total number of times a video has been viewed in a statistical cycle) accurately and scientifically.

In order to solve the above technical problems, it is considered in embodiments of the present disclosure to apply artificial intelligence to determine the speed variation rate of the video material, thereby accurately determining the speed variation rate of each video segment of the initial video, reducing the dependence on the user's editing experience, simplifying the user's operation, improving the processing efficiency, reducing the cost of manpower, and effectively improving the video performance capability, reasonably increasing the density of the video information, and increasing the number of overall playing of the released video.

Specifically, a machine learning model may be trained, an input of the model is an initial video segment, a variation speed rate of the initial video segment may be determined based on an output of the machine learning model, and then the initial video segment may be speed varied based on the variation speed rate.

The method of video processing of embodiments of the present disclosure may be applied in a video editing process to obtain a speed-varied target video. Certainly, the method of video processing may also be applied in a video playing process, i.e., when playing a certain video, determining a variation speed rate of a certain initial video segment of the currently playing video by the above process, and playing the initial video segment in accordance with the variation speed rate.

The method of video processing of embodiments of the present disclosure is appropriate for an application scenario as shown in FIG. 1, comprising: a terminal device 10, which may further comprise a video capturing device 12 and/or a video storage device 13, wherein the video capturing device 12 and/or the video storage device 13 are used to provide an initial video to the terminal device 10, or, if the terminal device 10 is configured with a camera, the application scenario may also comprise only the terminal device 10, with the terminal device 10 capturing the initial video itself; the terminal device 10 may comprise, but is not limited to, a smartphone, a tablet computer, a laptop computer, a personal computer, a personal digital assistant, a wearable device, and the like. The terminal device 10 may obtain the initial video segment by, for example dividing the initial video, and then process the initial video segment based on the machine learning model. The variation speed rate of the initial video segment is determined based on the output of the machine learning model, and the target video segment is obtained by conducting a speed variation of the initial video segment based on the variation speed rate.

Herein the machine learning model may be preconfigured on the terminal device 10; and certainly, it may also be configured on a cloud server, wherein the terminal device 10 may send video frames of any video segment to the cloud server, and the evaluation parameters corresponding to the video segment are obtained by the cloud server and then sent to the terminal device 10. Furthermore, a training process for the machine learning model may be carried out on the terminal device 10 in advance, and certainly may be carried out on the cloud server in advance, and then the trained model is configured on the terminal device 10.

The process of the method of video processing provided in the present disclosure will be described in detail in the following with reference to specific embodiments.

Figure 2:
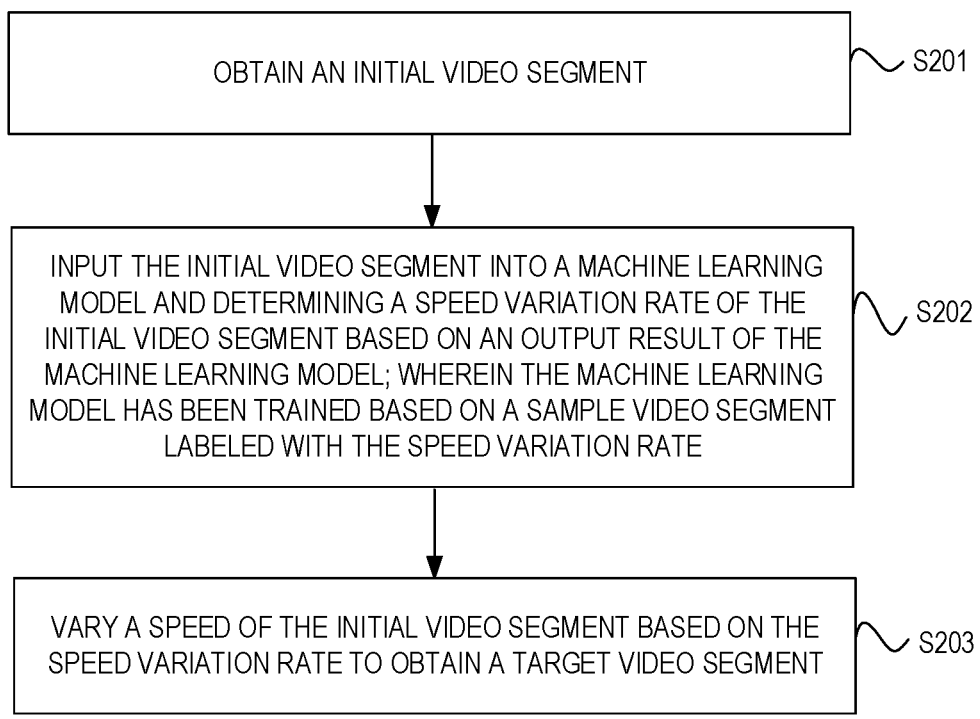
FIG. 2 shows a flow schematic diagram of a method of video processing provided by an embodiment of the present disclosure.

Referring to FIG. 2, which shows a flow schematic diagram of a method of video processing provided by an embodiment of the present disclosure. The method of this embodiment may be applied in the terminal device or the server, the method of video processing comprising:

S201. Obtain an initial video segment.

In the present embodiment, the initial video segment may be a video segment obtained from a video capture device or a video storage device, or a locally stored video segment, and the video segment may be an entire video segment or a segment of an entire video segment, which may not be limited herein.

S202. Input the initial video segment into a machine learning model and determining a speed variation rate of the initial video segment based on an output result of the machine learning model; wherein the machine learning model has been trained based on a sample video segment labeled with the speed variation rate.

In the present embodiment, the machine learning model may be a neural network model, or other machine learning model, which may not be limited herein. In addition, the input of the machine learning model is a video document of the initial video segment, or a video frame extracted from the initial video segment; the output of the machine learning model may be a variation speed rate of the initial video segment, or an evaluation parameter of the initial video segment, and the evaluation parameter being a parameter used to measure the size of the appropriate speed variation degree of the initial video segment, and the initial variation speed rate of the initial video segment may be determined based on the evaluation parameter of the initial video segment. The variation speed rate of the initial video segment can be determined based on the evaluation parameter of the initial video segment, and certainly the output of the machine learning model may not be limited to the above example but may obtain the variation speed rate of the initial video segment based on the output of the machine learning model. Correspondingly, the machine learning model can be designed and trained based on different inputs and outputs, which will not be repeated here.

S203. Vary a speed of the initial video segment based on the speed variation rate to obtain a target video segment.

In the present embodiment, after obtaining the variation speed rate of the initial video segment, the initial video segment may be subjected to a speed variation process based on the variation speed rate.

Alternatively, in the video editing process, editing of the initial video may be accomplished based on the variation speed rate of the initial video segment to generate a new video. Specifically, when the initial video segment is derived from the initial video, the target video may be obtained by replacing the initial video segment with the target video segment in the initial video after the target video segment is obtained.

Certainly, the above process may also be applied in a video playing process, i.e., when the initial video segment is being played, the initial video segment is played based on the variation speed rate of the initial video segment.

The present embodiment provides the method of video processing, by obtaining an initial video segment; inputting the initial video segment into a machine learning model and determining a speed variation rate of the initial video segment based on an output result of the machine learning model; wherein the machine learning model has been trained based on a sample video segment labeled with the speed variation rate; and varying a speed of the initial video segment based on the speed variation rate to obtain a target video segment. The present embodiment applies artificial intelligence to determine the variation speed rate of the initial video segment by the machine learning model, reduces the dependence on the user's editing experience, simplifies the user's operation, improves the processing efficiency, reduces the cost of manpower, and effectively improves the video performance capability, reasonably improves the density of the video information, and increasing the number of overall playing of the released video.

Based on the above embodiment, obtaining the initial video segment as described in S201, comprises:

S2021. Obtain an initial video segment;

S2022. Obtain the initial video segment by performing a storyboard-process on the initial video, wherein the initial video segment is a storyboard segment in the initial video.

In the present embodiment, for the initial video, some segments may be appropriate for a speed variation and some segments may not be appropriate for a speed variation, and thus the initial video may be divided to video segments of smaller granularity, so as to facilitate the determination of the appropriateness of a speed variation for each of the video segments respectively, and the determination of a variation speed rate for the video segment that is appropriate for a speed variation.

Alternatively, it is considered in the present embodiment that when a certain part of the video is being conducted a speed variation, the part of the video generally has an associated portion, and the associated portion generally belongs to the same scene. Thus, when dividing the initial video into a plurality of video segments, the initial video may be performed a storyboard-process based on the scene, and the same scene is determined as a storyboard segment, and the initial video segment in the aforementioned embodiment may be a certain storyboard segment.

Alternatively, considering that a storyboard segment may also be longer, a plurality of video segments are obtained by conducting a division based on the storyboard segment in accordance with a predetermined duration. For example, the predetermined duration may be 1 second or other duration, and any video segment of the storyboard segment may also be determined as the initial video segment in the present embodiment.

Alternatively, in the process of conducting an editing of the entire segment of the storyboard segment of the initial video, it is necessary to obtain a variation speed rate of each video segment of the storyboard segment. Alternatively, when dividing the storyboard segment, the adjacent video segments may have a certain time overlap, and taking the predetermined duration of 1 second as an example, the adjacent video segments in the present embodiment may have a certain time overlap, for example, the first video segment may be 0-1 second, the second video segment may be 0.5-1.5 seconds, the third video segment may be 1-2 seconds, and so on, Through the time overlap, it is possible to determine more accurately the degree of speed variation of each video segment in the subsequent process. Certainly, adjacent video segments may not have a time overlap, i.e., the first video segment may be 0-1 second, the second video segment may be 1-2 seconds, and so on. In addition, if the duration of the storyboard segment is less than or equal to the predetermined duration, the storyboard segment may not be divided.

Further, on the basis of the above embodiment, the initial video segment may also be frame-extracted, and the video frames in the initial video segment may be extracted as inputs to the machine learning model. Alternatively, the initial video segment may be frame-extracted in accordance with a predetermined frame rate, and the video frames in the initial video segment may be obtained, e.g., the predetermined frame rate may be 30 fps, i.e., 30 video frames may be obtained for each second of the video segment.

Figure 3:
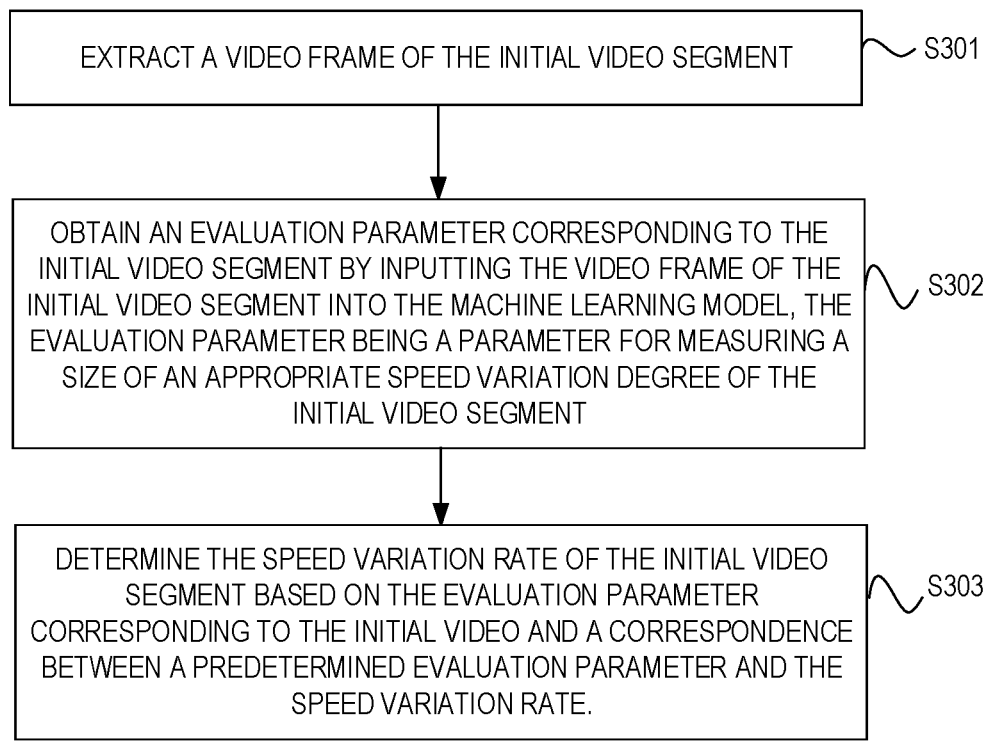
FIG. 3 shows a flow schematic diagram of a method of video processing provided by another embodiment of the present disclosure.

On the basis of the above embodiment, as shown in FIG. 3, as described in S202 that inputs the initial video segment into a machine learning model and determines a speed variation rate of the initial video segment based on an output result of the machine learning model, which may specifically comprise:

S301. Extract a video frame of the initial video segment;

S302. Obtain an evaluation parameter corresponding to the initial video segment by inputting the video frame of the initial video segment into the machine learning model, the evaluation parameter being a parameter for measuring a size of an appropriate speed variation degree of the initial video segment;

S303. Determine the speed variation rate of the initial video segment based on the evaluation parameter corresponding to the initial video and a correspondence between a predetermined evaluation parameter and the speed variation rate.

In the present embodiment, a variation speed rate of the initial video segment can be obtained, on the basis of the video frames of the initial video segment, based on the machine learning model.

Alternatively, the machine learning model may be a neural network model for evaluating the degree of appropriate speed variation of the initial video segment; the input of the model is a video frame of the initial video segment, and the output is an evaluation parameter of the video segment, which is used to represent the degree of appropriate speed variation of the initial video segment, e.g. the evaluation parameter takes a value in the range of 0-1, with the value closer to 0 representing the more appropriate decelerating of the initial video segment, and the closer to 1 representing the more appropriate accelerating of the initial video segment. Herein, the video segment appropriate for decelerating generally has at least one of the characteristics: the subject being clear, the camera or the subject having a faster movement, and being able to show more details and beauty (e.g., pouring water, running fast, and hitting the ball at the moment, etc.); whereas the video segment appropriate for accelerating generally has smaller variations between adjacent frames, contains less information, and so on. Learning by training the neural network model, the corresponding evaluation parameters of the appropriate degree of speed variation can be obtained based on the video frames of the input initial video segment.

Further, after obtaining the evaluation parameter of the initial video segment, the variation speed rate of the initial video segment may be obtained based on the evaluation parameter of the initial video segment. In the above embodiment, different evaluation parameters represent different degrees of appropriateness of the video segment for speed variation. In particular, the evaluation parameter takes a value in the range of 0-1, the closer the evaluation parameter is to 0 means the more appropriate the video segment is for deceleration, i.e., the smaller the evaluation parameter is the more appropriate the video segment is for deceleration, the closer the evaluation parameter is to 1 means the more appropriate the video segment is for acceleration, i.e., the larger the evaluation parameter is the more appropriate the video segment is for acceleration. There is a correspondence between the evaluation parameter and the variation speed rate. In the present embodiment, the correspondence between the evaluation parameter and the variation speed rate can be obtained in advance, and then the variation speed rate of the initial video segment can be obtained based on the correspondence between the predetermined evaluation parameter and the variation speed rate, and the evaluation parameter corresponding to the initial video segment, i.e., by searching for the correspondence between the evaluation parameter and the variation speed rate, a variation speed rate corresponding to the evaluation parameter corresponding to the initial video segment can be found, as the initial video segment.

In another alternative embodiment, the machine learning model is a neural network model for obtaining a variation speed rate, i.e., the input of the model is a video frame of the initial video segment, and the output is a variation speed rate of the initial video segment, i.e., the conversion process between the evaluation parameter to the variation speed rate is no longer performed independently. Thus, based on the machine learning model, S202 is specifically inputting the video frames of the initial video segment into the machine learning model, and outputting the variation speed rate of the initial video segment through the machine learning model.

On the basis of any of the above embodiments, alternatively, after obtaining the evaluation parameters corresponding to said initial video segment as described in S302, it may further comprise:

performing a smoothing process on the evaluation parameter corresponding to the initial video segments and evaluation parameters corresponding to other adjacent initial video segments, and determining the respective evaluation parameters after the smoothing process as corresponding final evaluation parameter of each initial video segment.

In the present embodiment, in order to avoid the initial video segment and its adjacent video segments from having a sudden speed variation when conducting a speed variation, resulting in the transition being unsmooth or unnatural, which affects the ability of the video performance, a smoothing process can be performed on the evaluation parameters of the adjacent video segments. For example, a window smoothing is conducted on the evaluation parameters in the time axis dimension, wherein a triangular window or a rectangular window may be added to make the evaluation parameters smoother and more natural with respect to the time axis variations and transitions, which in turn may make the subsequently obtained initial video segment and its adjacent video segments with respect to the variation speed rate with respect to the time axis variations and transitions remain smooth and natural as well.

In another alternative embodiment, after determining the speed variation rate of the initial video segment as described in S303, perform a smoothing process on the speed variation rate of the initial video segment and speed variation rates of other adjacent initial video segments, and determine the respective smooth-processed speed variation rates as corresponding final speed variation rate of each initial video segment. By smoothing the variation speed rate in the present embodiment, the variation speed rate of the initial video segment and its adjacent video segments can remain smooth and natural with the timeline changes and transitions. Herein, the smoothing process may be the same as the above-described embodiment and will not be repeated herein.

Figure 4:
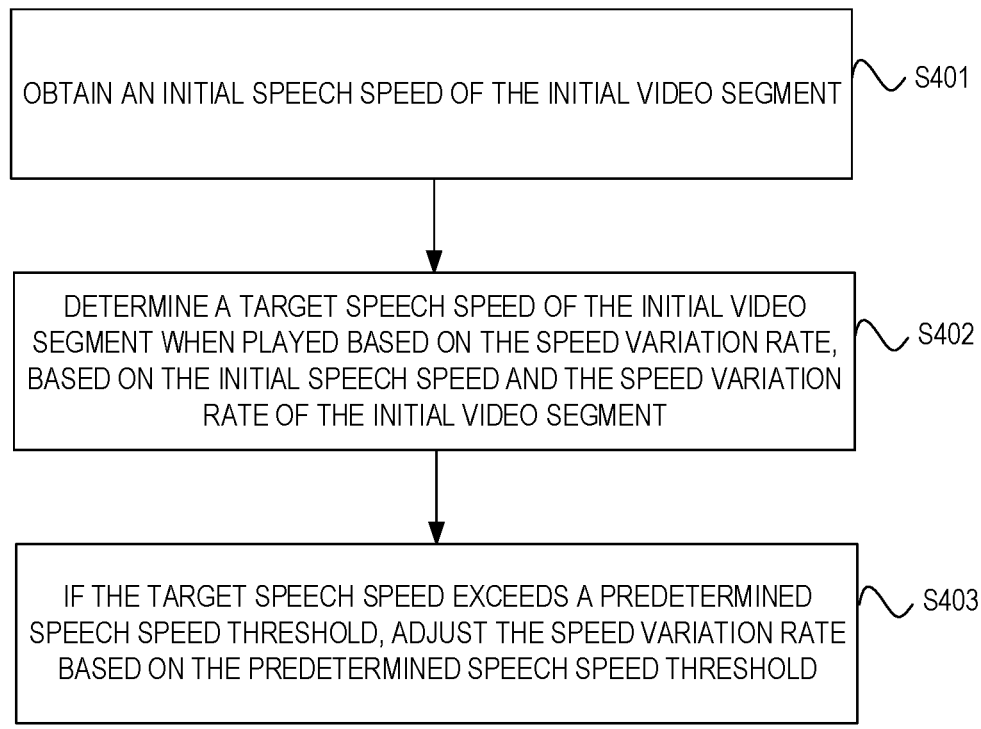
FIG. 4 shows a flow schematic diagram of a method of video processing provided by another embodiment of the present disclosure.

On the basis of any of the above embodiments, as shown in FIG. 4, after determining the speed variation rate of the initial video segment, it may further comprise:

S401. Obtain an initial speech speed of the initial video segment;

S402. Determine a target speech speed of the initial video segment when played based on the speed variation rate, based on the initial speech speed and the speed variation rate of the initial video segment;

S403. If the target speech speed exceeds a predetermined speech speed threshold, adjust the speed variation rate based on the predetermined speech speed threshold.

In the present embodiment, since some initial video segments may be accompanied by speech, in order to avoid the speed being too fast after the initial video segment is speed-varied to result in an excessively high density of information or that the speed is too slow to result in an excessively low density of information, a predetermined speed threshold may be configured, for example, it may be set to an average speed of speech of 8 words/second, a peak speed of speech of 10 words/second, etc. Further, after obtaining the initial speech speed in the initial video segment, the target speech speed when the initial video segment is being played in accordance with the variation speed rate, i.e., the speed-varied speech speed, is determined based on the initial speech speed as well as the target variation speed rate of the initial video segment, and the target speech speed is then compared with the predetermined speech speed threshold value. If the target speech speed exceeds the predetermined speech speed threshold, the variation speed rate is adjusted based on the predetermined speech speed threshold, so that the target speech speed when the initial video segment is being played in accordance with the adjusted variation speed rate does not exceed the predetermined speech speed threshold, and the adjusted variation speed rate is determined to be the final variation speed rate of the initial video segment.

Figure 5:
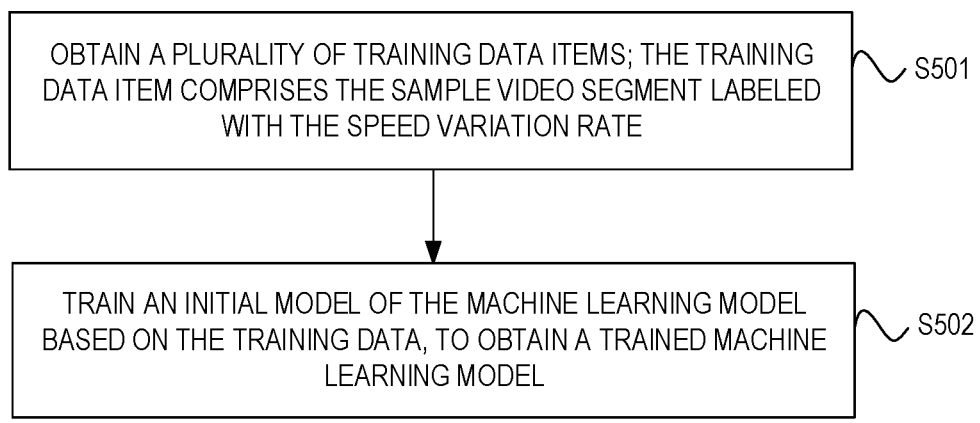
FIG. 5 shows a flow schematic diagram of a method of video processing provided by another embodiment of the present disclosure.

On the basis of any of the above embodiments, as shown in FIG. 5, the present method further comprises a process of training the machine learning model, the performing subject of which may be the performing subject of the above embodiment of the method of video processing, or any other electronic device such as a terminal device or a server, wherein the machine learning model is a neural network model for evaluating the appropriate degree of speed variation of video segments, the training process is specified as below:

S501. Obtain a plurality of training data items; the training data item comprises the sample video segment labeled with the speed variation rate.

S502. Train an initial model of the machine learning model based on the training data, to obtain a trained machine learning model.

In the present embodiment, some training data items may first be collected, the training data may comprise the sample video segment labeled with the speed variation rate and obtain the trained machine learning model by training the initial model of the machine learning model based on the training data.

Alternatively, a sample video segment labeled with the speed variation rate may be obtained, and the sample video segment is a video material that has been decelerated or accelerated and labeled with a deceleration label or an acceleration label, and/or a video material that has not been decelerated or accelerated and whose respective video segments are labeled with a label identifying the appropriate degree of variation speed rate; extracting a video frame from the sample video segment, and determining the video frame as the training data. Herein, for the video segment that has been decelerated or accelerated and labeled with a deceleration label or an acceleration label, the real variation speed rate can be directly labeled, whereas, for the video segment that has not been decelerated or accelerated and whose respective video segments are labeled with a label identifying the appropriate degree of variation speed rate, the video segments can be given a suitable variation speed rate based on the appropriate degree of variation speed rate.

Alternatively, the training data may further be a sequence of consecutive video frames labeled with a predetermined label. Herein, alternatively, the predetermined labels may comprise labels identifying a suitable degree of variation speed or labels identifying a variation speed situation, wherein the labels identifying the variation speed situation may be labels identifying the labels that have been decelerated, labels identifying the labels that have been accelerated, and further labels identifying a corresponding variation speed rate; whereas the label identifying a suitable degree of variable speed may be a label of a video segment by assigning a numerical value to a sequence of consecutive video frames suitable for deceleration in accordance with a suitable degree, and assigning a numerical value to a sequence of consecutive video frames suitable for acceleration in accordance with the predetermined labels. As an example, four values of 0, 1, 2, and 3 can be used as labels, where a larger value indicates that it is more suitable for deceleration, and a smaller value indicates that it is more suitable for fast acceleration.

In an alternative embodiment, sequences of consecutive video frames are extracted by extracting them from the video material. Specifically, labeled video material may be obtained, and the labeled video material may comprise: a video material that has been decelerated or accelerated and labeled with a deceleration label or an acceleration label, and/or a video material that has not been decelerated or accelerated and whose respective video segments are labeled with a label identifying the appropriate degree of variation speed rate. Further, video frames may be extracted from video segments of the video material and determined the video frames as the training data. Herein the extracted video frames may carry the labels with which the video material is labeled. By model training the video frames, obtained from video material that has been decelerated or accelerated and labeled with a deceleration label or an acceleration label, can enable the model to better learn the characteristics of the real video segments that have been decelerated or accelerated; by model training the video frames, obtained from video material that has not been decelerated or accelerated and whose respective video segments are labeled with a label identifying the appropriate degree of variation speed rate, can enable the model to better learn what kind of video segments are appropriate for speed variation, and the corresponding appropriate degree of variation speed rate.

Herein the video material labeling process can be carried out manually, based on the predetermined labeling rules, for example, for video segments with clear subjects in the video material, with faster movement of the camera or subject, and which can show more details and beauty (e.g., pouring water, running fast and hitting the ball at the moment, etc.), they can be identified as video segments suitable for deceleration; video segments that have less variation between adjacent video segments and contain less information can be identified as suitable for acceleration. The video segments suitable for deceleration can be assigned numerical values in accordance with the degree of suitability, and the video segments suitable for acceleration can be assigned numerical values in accordance with the degree of suitability, as labels for the video segments. As an example, four numerical values of 0, 1, 2, and 3 may be used as labels, wherein the larger the numerical value the more suitable for deceleration, and the smaller the numerical value the more suitable for acceleration.

After obtaining the training data, the initial model of the machine learning model may be trained to obtain the machine learning model. Herein, the initial model of the machine learning model may be a 3D convolutional neural network, or it may also be other artificial intelligence model, machine learning model, which is not limited herein, and the specific training process is not described herein. It should be noted that in the present embodiment, video segments can be divided for the labeled video material, for example, by first performing a storyboard-process and dividing the storyboard segments in accordance with a predetermined length of time, so as to obtain a plurality of video segments, and then extracting frames from each of the video segments, and obtaining video frames for each of the video segments.

In the present embodiment, when training the initial model of the machine learning model, the sequences of consecutive video frames of the video segments of the different video materials are not in any order among themselves and can be randomly disrupted. For example, the model may be trained first based on the sequences of consecutive video frames of a second video segment of a first video material, then based on the sequences of consecutive video frames of a first video segment of a second video material, then based on the sequences of consecutive video frames of a first video segment of the first video material, and so on, with no restriction on the order of training. Certainly the present embodiment also provides training in an orderly regression, i.e., training the model based on the consecutive video frame sequence training model of the first video segment of the first video material, then training the model based on the consecutive video frame sequence training model of the second video segment of the first video material, then training the model based on the consecutive video frame sequence training model of the third video segment of the first video material, and so forth in the order of training. In the above example, since the labels of the video segments are discrete values, the probability of being greater than a certain value is obtained when the result of the ordered regression is passed, e.g., for a certain video segment, the model may output the probability of it being greater than 1 as 0.8, the probability of it being greater than 2 as 0.5, and the probability of it being greater than 3 as 0.2, and then these probabilities are obtained by a weighted transformation of the evaluation parameter in the range of 0 to 1.

By the method of video processing provided in respective embodiments described above, artificial intelligence is applied to determine the variation speed rate of respective video segments of the initial video by means of a machine learning model, reducing the dependence on the user's editing experience, simplifying the user's operation, improving the processing efficiency, reducing the cost of manpower, and efficiently improving the video performance capability, reasonably increasing the density of the video information, and increasing the number of overall playing of the released video.

Figure 6:
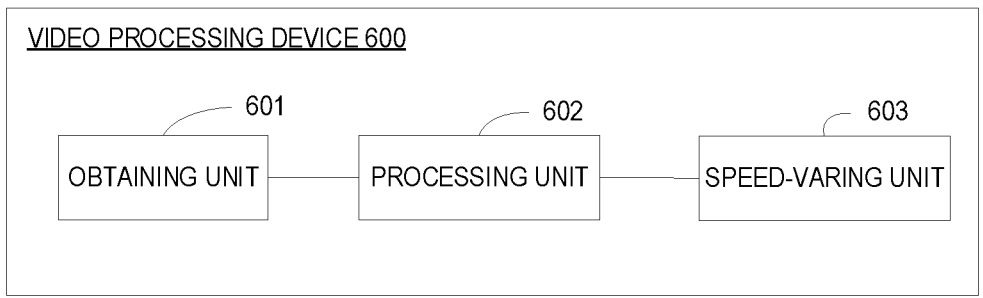
FIG. 6 shows a structural block diagram of a device of video processing provided by an embodiment of the present disclosure.

Corresponding to the method of video processing provided by the embodiments of the present disclosure above, FIG. 6 shows a structural block diagram of a device of video processing provided by an embodiment of the present disclosure. For purposes of illustration, only portions relevant to the embodiments of the present disclosure are shown. Referring to FIG. 6, the described video processing device 600 comprises: an obtaining unit 601, a processing unit 602, and a speed-varying unit 603.

An obtaining unit 601 is configured to obtain an initial video segment;

A processing unit 602 is configured to input the initial video segment into a machine learning model and determine a speed variation rate of the initial video segment based on an output result of the machine learning model; wherein the machine learning model has been trained based on a sample video segment labeled with the speed variation rate;

A speed-varying unit 603 is configured to vary a speed of the initial video segment based on the speed variation rate to obtain a target video segment.

According to one or more embodiments of the present disclosure, the obtaining unit 601, when obtaining an initial video segment, is configured to:
　　obtain an initial video; and
　　obtain the initial video segment by performing a storyboard-process on the initial video, wherein the initial video segment is a storyboard segment in the initial video.

According to one or more embodiments of the present disclosure, the speed-varying unit 603, after obtaining a target video segment, is further configured to:
　　obtain a target video by replacing the initial video segment of the initial video with the target video segment.

According to one or more embodiments of the present disclosure, the obtaining unit 601, when obtaining the initial video segment by performing a storyboard-process on the initial video, is configured to:
　　obtain the storyboard segment of the initial video by performing a storyboard-process on the initial video; and
　　divide the storyboard segment into a plurality of video segments and determine any one of the video segments as the initial video segment.

According to one or more embodiments of the disclosure, the processing unit 602, when inputting the initial video segment into a machine learning model and determining a speed variation rate of the initial video segment based on an output result of the machine learning model, is configured to:
　　extract a video frame of the initial video segment;
　　obtain an evaluation parameter corresponding to the initial video segment by inputting the video frame of the initial video segment into the machine learning model, the evaluation parameter being a parameter for measuring a size of an appropriate speed variation degree of the initial video segment; and
　　determine the speed variation rate of the initial video segment based on the evaluation parameter corresponding to the initial video and a correspondence between a predetermined evaluation parameter and the speed variation rate.

According to one or more embodiments of the present disclosure, the processing unit 602, after obtaining an evaluation parameter corresponding to the initial video segment, is further configured to:
　　perform a smoothing process on the evaluation parameter corresponding to the initial video segments and evaluation parameters corresponding to other adjacent initial video segments, and determining the respective evaluation parameters after the smoothing process as corresponding final evaluation parameter of each initial video segment; or and the method further comprises, after determining the speed variation rate of the initial video segment:

performing a smoothing process on the speed variation rate of the initial video segment and speed variation rates of other adjacent initial video segments, and determining the respective smooth-processed speed variation rates as corresponding final speed variation rate of each initial video segment.

According to one or more embodiments of the present disclosure, the processing unit 602, after determining the speed variation rate of the initial video segment, is further configured to:

obtain an initial speech speed of the initial video segment;

determine a target speech speed of the initial video segment when played based on the speed variation rate, based on the initial speech speed and the speed variation rate of the initial video segment; and if the target speech speed exceeds a predetermined speech speed threshold, adjust the speed variation rate based on the predetermined speech speed threshold.

A device of video processing provided in the present embodiment may be used to perform the technical solutions of the above-described embodiments of the method of video processing, which are similar in terms of implementation principles and technical effects, and which will not be repeated herein in the present embodiment.

Figure 7:
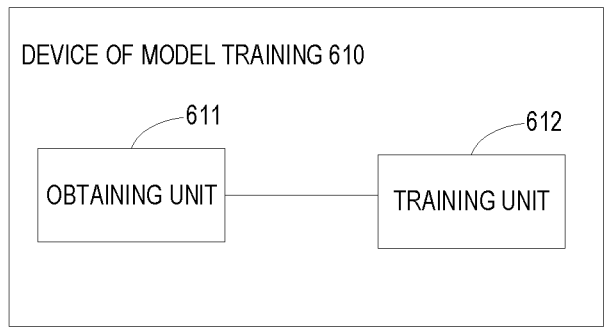
FIG. 7 shows a structural block diagram of a device of model training provided for an embodiment of the present disclosure.

Corresponding to the method of video processing in the embodiments of the present disclosure above, FIG. 7 shows a structural block diagram of a device of model training provided for an embodiment of the present disclosure. For purposes of illustration, only portions relevant to embodiments of the present disclosure are shown. Referring to FIG. 7, a device of model training 610 comprises: an obtaining unit 611 and a training unit 612.

The obtaining unit 611 is configured to obtain a plurality of training data items; the training data item comprising the sample video segment labeled with the speed variation rate;

The training unit 612 is configured to obtain an initial model of the machine learning model based on the training data, to obtain a trained machine learning model.

According to one or more embodiments of the present disclosure, the obtaining unit 611, when obtaining a plurality of training data, is used to:

obtain the sample video segment labeled with the speed variation rate, the sample video segment being a video material that has been decelerated or accelerated and has been labeled with a deceleration label or an acceleration label, and/or, a video material that has not been decelerated or accelerated and respective video segments of which have labeled with a label indicating an appropriate speed variation degree; and extract a video frame of the sample video segment and determine the video frame as the training data item. The present embodiment provides a device of model training, which can be used to perform the technical solutions of the above-described embodiments of the method of model training, which are similar in terms of realization principles and technical effects, and which will not be repeated herein in the present embodiment.

Figure 8:
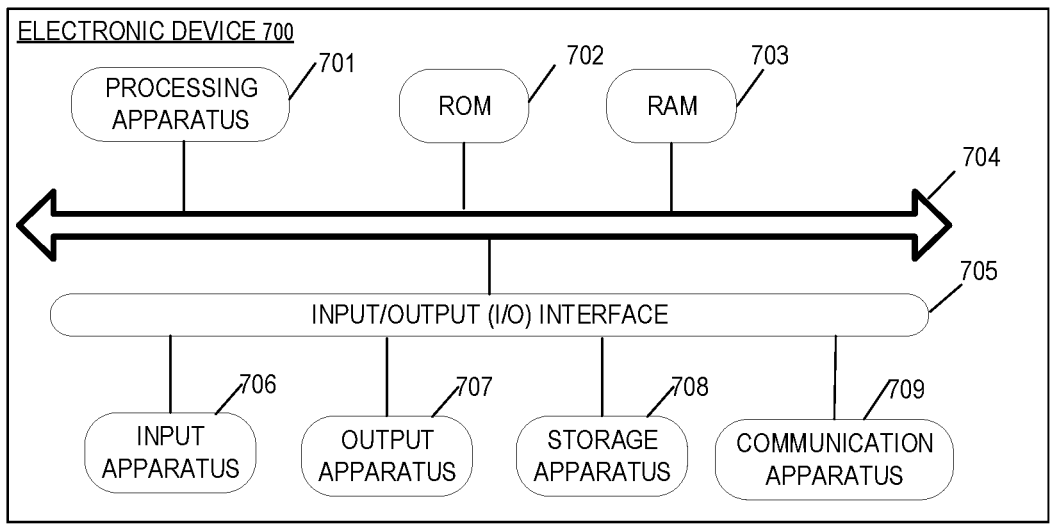
FIG. 8 shows a structural schematic diagram of a hardware structure of an electronic device provided by an embodiment of the present disclosure.

Referring to FIG. 8, which shows a structural schematic diagram of an electronic device 700 appropriate for implementing embodiments of the present disclosure, the electronic device 700 may be a terminal device or a server. Herein, the terminal device may comprise but is not limited to, such cell phones, laptop computers, digital broadcast receivers, personal digital assistants (Personal Digital Assistant, abbreviated as PDA), tablet computers (Portable Android Device, abbreviated as PAD), portable multimedia players (Portable Media Player, abbreviated as PMP), vehicle terminals (such as vehicle navigation terminals) and other mobile terminals and fixed terminals such as digital TV, desktop computers and so on. Media Player referred to as PMP), vehicle terminals (such as vehicle navigation terminals), and other mobile terminals, as well as fixed terminals such as digital TV, desktop computers, and so on. The electronic device illustrated in FIG. 8 is only an example and should not impose any limitation on the functionality and scope of use of the embodiment of the present disclosure.

As illustrated in FIG. 8, the electronic device 700 can include a processing apparatus (such as a central processing unit, graphics processor, etc.) 701, which can execute various appropriate actions and processes according to a program stored in a read-only memory (Read Only Memory, ROM for short) 702 or loaded from a storage apparatus 708 into a random-access memory (Random Access Memory, RAM for short) 703. In the RAM 703, various programs and data required for the operation of the electronic device 700 are also stored. The processing apparatus 701, the ROM 702, and the RAM 703 are connected to each other through the bus 704. An Input/Output (I/O) interface 705 is also connected to bus 704.

Generally, the following apparatuses can be connected to the I/O interface 705: including an input apparatus 706 such as touch screens, touch pads, keyboards, mice, cameras, microphones, accelerometers, gyroscopes, etc.; including, for example, Liquid Crystal Display (LCD for short), an output apparatus 707 such as a speaker, a vibrator, etc.; a storage apparatus 708 such as a magnetic tape, a hard disk, etc.; and a communication apparatus 709. The communication apparatus 709 may allow the electronic device 700 to conduct wireless or wired communication with other devices to exchange data. Although FIG. 8 illustrates the electronic device 700 with various apparatuses, it should be understood that it is not required to implement or have all the illustrated apparatuses. Alternatively, more, or fewer apparatuses may be implemented or provided.

Specifically, according to the embodiments of the present disclosure, the process described above with reference to the flow diagram can be implemented as a computer software program. For example, an embodiment of the present disclosure includes a computer program product, which includes a computer program carried on a computer-readable medium, and the computer program includes a program code for executing the method shown in the flowchart. In such embodiments, the computer program can be downloaded and installed from the network through the communication apparatus 709, installed from the storage apparatus 708, or installed from the ROM 702. When the computer program is executed by the processing apparatus 701, the above functions defined in the embodiment of the present disclosure are executed.

It should be noted that the computer-readable medium mentioned in the present disclosure can be a computer-readable signal medium, a computer-readable storage medium, or any combination of the two. The computer-readable storage medium can be, for example, but not limited to, an electrical, magnetic, optical, electromagnetic, infrared, or semiconductor system, apparatus, or device, or a combination of any of the above. More specific examples of the computer-readable storage medium may include but are not limited to electrical connections with one or more wires, portable computer disks, hard disks, random access memory (RAM), read-only memory (ROM), Erasable Programmable Read-Only Memory (EPROM or flash memory), optical fiber, Portable Compact Disk Read-Only Memory (CD-ROM), optical storage devices, magnetic storage devices, or any appropriate combination of the above. In the present disclosure, a computer-readable storage medium may be any tangible medium that contains or stores a program, which may be used by or in combination with an instruction execution system, apparatus, or device. In the present disclosure, the computer-readable signal medium may include data signals propagated in the baseband/or as part of the carrier, wherein a computer-readable program code is carried. The propagation of data signals can adopt various forms, including but not limited to electromagnetic signals, optical signals, or any appropriate combination of the above. The computer-readable signal medium can also be any computer-readable medium other than a computer-readable storage medium. The computer-readable signal medium may send, propagate, or transmit programs for use by or in combination with instruction execution systems, apparatuses, or devices. The program code contained on the computer-readable medium can be transmitted by any appropriate medium, including but not limited to wire, optical cable, Radio Frequency (RF), etc., or any appropriate combination of the above.

The computer-readable medium may be included in the electronic device, or it may exist alone without being assembled into the electronic device.

The computer-readable medium carries one or more programs, and when one or more programs are executed by the electronic device, the electronic device is caused to execute the method shown in the embodiment.

The computer program code used to execute the operations of the present disclosure may be written in one or more programming languages or a combination thereof. The programming languages include object-oriented programming languages—such as Java, Smalltalk, and C++, and conventional procedural programming languages—such as "C" language or similar programming languages. The program code can be executed entirely on the user's computer, partly on the user's computer, executed as an independent software package, partly on the user's computer, partly executed on a remote computer, or entirely executed on the remote computer or server. In the case of a remote computer, the remote computer can be connected to the user's computer through any kind of network—including a Local Area Network (LAN for short) or a Wide Area Network (WAN for short)—or it can be connected to an external computer (for example, using an Internet service provider to connect via the Internet).

The flow diagrams and block diagrams in the accompanying drawings illustrate the possible impossible architecture, functions, and operations of systems, methods, and computer program products according to various embodiments in the present disclosure. At this point, each block in a flow diagram or block diagram can represent a module, program segment, or part of code that contains one or more executable instructions for implementing specified logical functions. It should also be noted that in some alternative implementations, the functions indicated in the blocks can also occur in a different order than those indicated in the accompanying drawings. For example, two consecutive blocks can actually be executed in parallel, and sometimes they can also be executed in the opposite order, depending on the function involved. It should also be noted that each block in the block diagram and/or flow diagram, as well as the combination of blocks in the block diagram and/or flow diagram, can be implemented using dedicated hardware-based systems that execute specified functions or operations or can be implemented using a combination of dedicated hardware and computer instructions.

The units involved in the embodiments described in the present disclosure may be implemented by way of software or by way of hardware. Herein, the name of the unit does not constitute a limitation on the unit per se under certain circumstances. For example, a first obtaining unit can also be described as "a unit for obtaining at least two Internet Protocol addresses."

The functions described above may be at least partially executed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System-on-a-chip (SOC), Complex Programmable Logical device (CPLD), and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include but is not limited to, an electronic, magnetic, optical, electromagnetic, infrared, or semiconductor system, apparatus, or device, or any appropriate combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any appropriate combination of the foregoing.

In a first aspect, a method of video processing is provided according to one or more embodiments of the present disclosure, comprising:
  obtaining an initial video segment;
  inputting the initial video segment into a machine learning model and determining a speed variation rate of the initial video segment based on an output result of the machine learning model; wherein the machine learning model has been trained based on a sample video segment labeled with the speed variation rate; and
  varying a speed of the initial video segment based on the speed variation rate to obtain a target video segment.

According to one or more embodiments of the present disclosure, obtaining an initial video segment comprises:
  obtaining an initial video; and
  obtaining the initial video segment by performing a storyboard-process on the initial video, wherein the initial video segment is a storyboard segment in the initial video.

According to one or more embodiments of the present disclosure, further comprises, after obtaining a target video segment:
  obtaining a target video by replacing the initial video segment of the initial video with the target video segment.

According to one or more embodiments of the present disclosure, obtaining the initial video segment by performing a storyboard-process on the initial video comprises:
    obtaining the storyboard segment of the initial video by performing a storyboard-process on the initial video; and
    dividing the storyboard segment into a plurality of video segments and determining any one of the video segments as the initial video segment.

According to one or more embodiments of the present disclosure, inputting the initial video segment into a machine learning model and determining a speed variation rate of the initial video segment based on an output result of the machine learning model comprises:
    extracting a video frame of the initial video segment;
    obtaining an evaluation parameter corresponding to the initial video segment by inputting the video frame of the initial video segment into the machine learning model, the evaluation parameter being a parameter for measuring a size of an appropriate speed variation degree of the initial video segment; and
    determining the speed variation rate of the initial video segment based on the evaluation parameter corresponding to the initial video and a correspondence between a predetermined evaluation parameter and the speed variation rate.

According to one or more embodiments of the present disclosure, further comprises, after obtaining an evaluation parameter corresponding to the initial video segment:
    performing a smoothing process on the evaluation parameter corresponding to the initial video segments and evaluation parameters corresponding to other adjacent initial video segments, and determining the respective evaluation parameters after the smoothing process as corresponding final evaluation parameter of each initial video segment; or
    and the method further comprises, after determining the speed variation rate of the initial video segment:
    performing a smoothing process on the speed variation rate of the initial video segment and speed variation rates of other adjacent initial video segments, and determining the respective smooth-processed speed variation rates as corresponding final speed variation rate of each initial video segment.

According to one or more embodiments of the present disclosure, further comprises, after determining the speed variation rate of the initial video segment:
    obtaining an initial speech speed of the initial video segment;
    determining a target speech speed of the initial video segment when played based on the speed variation rate, based on the initial speech speed and the speed variation rate of the initial video segment; and
    if the target speech speed exceeds a predetermined speech speed threshold, adjusting the speed variation rate based on the predetermined speech speed threshold.

In a second aspect, a method of model training is provided based on one or more embodiments of the present disclosure, which comprises:
    obtaining a plurality of training data items; the training data item comprising the sample video segment labeled with the speed variation rate; and
    training an initial model of the machine learning model based on the training data, to obtain a trained machine learning model.

According to one or more embodiments of the present disclosure, obtaining a plurality of training data items comprises:
    obtaining the sample video segment labeled with the speed variation rate, the sample video segment being a video material that has been decelerated or accelerated and has been labeled with a deceleration label or an acceleration label, and/or, a video material that has not been decelerated or accelerated and respective video segments of which have labeled with a label indicating an appropriate speed variation degree; and
    extracting a video frame of the sample video segment and determining the video frame as the training data item.

In a third aspect, a device of video processing is provided according to one or more embodiments of the present disclosure, comprising:
    an obtaining unit, configured to obtain an initial video segment;
    a processing unit, configured to input the initial video segment into a machine learning model and determine a speed variation rate of the initial video segment based on an output result of the machine learning model; wherein the machine learning model has been trained based on a sample video segment labeled with the speed variation rate; and
    a speed-varying unit, configured to vary a speed of the initial video segment based on the speed variation rate to obtain a target video segment.

According to one or more embodiments of the present disclosure, the obtaining unit, when obtaining an initial video segment, is configured to:
    obtain an initial video; and
    obtain the initial video segment by performing a storyboard-process on the initial video, wherein the initial video segment is a storyboard segment in the initial video.

According to one or more embodiments of the present disclosure, the speed-varying unit, after obtaining a target video segment, is further configured to:
    obtain a target video by replacing the initial video segment of the initial video with the target video segment.

According to one or more embodiments of the disclosure, the obtaining unit, when obtaining the initial video segment by performing a storyboard-process on the initial video, is further configured to:
    obtain the storyboard segment of the initial video by performing a storyboard-process on the initial video; and
    divide the storyboard segment into a plurality of video segments and determine any one of the video segments as the initial video segment.

According to one or more embodiments of the present disclosure, the processing unit, when inputting the initial video segment into a machine learning model and determining a speed variation rate of the initial video segment based on an output result of the machine learning mode, is configured to:
    extract a video frame of the initial video segment;
    obtain an evaluation parameter corresponding to the initial video segment by inputting the video frame of the initial video segment into the machine learning model, the evaluation parameter being a parameter for measuring a size of an appropriate speed variation degree of the initial video segment; and
    determine the speed variation rate of the initial video segment based on the evaluation parameter corresponding to the initial video and a correspondence between a predetermined evaluation parameter and the speed variation rate.

According to one or more embodiments of the present disclosure, the processing unit, after obtaining an evaluation parameter corresponding to the initial video segment, is further configured to:

perform a smoothing process on the evaluation parameter corresponding to the initial video segments and evaluation parameters corresponding to other adjacent initial video segments, and determine the respective evaluation parameters after the smoothing process as corresponding final evaluation parameter of each initial video segment; or and the method further comprises, after determining the speed variation rate of the initial video segment:

performing a smoothing process on the speed variation rate of the initial video segment and speed variation rates of other adjacent initial video segments, and determining the respective smooth-processed speed variation rates as corresponding final speed variation rate of each initial video segment.

According to one or more embodiments of the present disclosure, the processing unit, after determining the speed variation rate of the initial video segment, is further configured to:

obtain an initial speech speed of the initial video segment;

determine a target speech speed of the initial video segment when played based on the speed variation rate, based on the initial speech speed and the speed variation rate of the initial video segment; and if the target speech speed exceeds a predetermined speech speed threshold, adjust the speed variation rate based on the predetermined speech speed threshold.

In a fourth aspect, a device of model training is provided according to one or more embodiments of the present disclosure, comprising:

an obtaining unit configured to obtain a plurality of training data items; the training data item comprising the sample video segment labeled with the speed variation rate; and a training unit configured to obtain an initial model of the machine learning model based on the training data, to obtain a trained machine learning model.

According to one or more embodiments of the present disclosure, the obtaining unit, when obtaining a plurality of training data items, is configured to:

obtain the sample video segment labeled with the speed variation rate, the sample video segment being a video material that has been decelerated or accelerated and has been labeled with a deceleration label or an acceleration label, and/or, a video material that has not been decelerated or accelerated and respective video segments of which have labeled with a label indicating an appropriate speed variation degree; and extract a video frame of the sample video segment and determine the video frame as the training data item.

In a fifth aspect, an electronic device is provided according to one or more embodiments of the present disclosure, comprising: at least one processor and memory; and the memory storing computer-executable instructions;

the computer-executable instructions, when executed by at least one processor, causing the at least one processor to execute the method of video processing mentioned in the first aspect, the second aspect, and the various possible designs of the first aspect and the second aspect.

In a sixth aspect, A computer-readable storage medium is provided according to one or more embodiments of the present disclosure, storing computer-executable instructions, the computer-executable instructions, when executed by a processor, implementing the method of video processing described in the first aspect, the second aspect, and the various possible designs of the first aspect and the second aspect.

In a seventh aspect, a computer program product is provided according to one or more embodiments of the present disclosure, comprising a computer program, the computer program, when executed by a processor, implementing the method of video processing described in the first aspect, the second aspect, and the various possible designs of the first aspect and the second aspect.

In an eighth aspect, a computer program is provided according to one or more embodiments of the present disclosure, when executed by a processor, implements a method of video processing described in the first aspect, the second aspect, and various possible designs of the first aspect and the second aspect.

The above description is only a preferred embodiment of the present disclosure and an explanation of the principles of the technique applied. It should be understood by those skill in the art that the scope of disclosure involved in the present disclosure is not limited to technical solutions resulting from a particular combination of the aforesaid technical features but shall also cover other technical solutions resulting from any combination of the aforesaid technical features or their equivalents without being separated from the aforesaid disclosed ideas. For example, the technical scheme formed by the substitution of the above features with the technical features disclosed in the present disclosure (but not limited to) having similar functions.

Furthermore, although each operation is depicted in a specific order, this should not be understood as requiring them to be executed in the specific order shown or in a sequential order. Under certain circumstances, multitasking and parallel processing may be advantageous. Similarly, although several specific implementation details are included in the above discussion, these should not be interpreted as limiting the scope of the present disclosure. Some features described in the context of individual embodiments can also be combined and implemented in a single embodiment. On the contrary, various features described in the context of a single embodiment can also be implemented individually or in any appropriate sub-combination in a plurality of embodiments.

Although the subject matter has been described in language specific to structural features and/or method logical actions, it should be understood that the subject matter limited in the accompanying claims may not necessarily be limited to the specific features or actions described above. On the contrary, the specific features and actions described above are only exemplary forms of implementing the claims.

We claim:

1. A method of video processing, comprising:
   obtaining an initial video segment;
   inputting the initial video segment into a machine learning model and determining a speed variation rate of the initial video segment based on an output result of the machine learning model;
   wherein the machine learning model has been trained based on a sample video segment labeled with the speed variation rate; and varying a speed of the initial video segment based on the speed variation rate to obtain a target video segment, wherein inputting the initial video segment into a machine learning model and determining a speed variation rate of the initial video segment based on an output result of the machine learning model comprises:

extracting a video frame of the initial video segment;

obtaining an evaluation parameter corresponding to the initial video segment by inputting the video frame of the initial video segment into the machine learning model, the evaluation parameter being a parameter for measuring a size of an appropriate speed variation degree of the initial video segment; and determining the speed variation rate of the initial video segment based on the evaluation parameter corresponding to the initial video and a correspondence between a predetermined evaluation parameter and the speed variation rate.

2. The method of claim 1, wherein obtaining an initial video segment comprises:

obtaining an initial video; and obtaining the initial video segment by performing a storyboard-process on the initial video, wherein the initial video segment is a storyboard segment in the initial video.

3. The method of claim 2, further comprising, after obtaining a target video segment:

obtaining a target video by replacing the initial video segment of the initial video with the target video segment.

4. The method of claim 2, wherein obtaining the initial video segment by performing a storyboard-process on the initial video comprises:

obtaining the storyboard segment of the initial video by performing a storyboard-process on the initial video; and dividing the storyboard segment into a plurality of video segments and determining any one of the video segments as the initial video segment.

5. The method of claim 1, further comprising, after obtaining an evaluation parameter corresponding to the initial video segment:

performing a smoothing process on the evaluation parameter corresponding to the initial video segments and evaluation parameters corresponding to other adjacent initial video segments, and determining the respective evaluation parameters after the smoothing process as corresponding final evaluation parameter of each initial video segment; or and the method further comprises, after determining the speed variation rate of the initial video segment:

performing a smoothing process on the speed variation rate of the initial video segment and speed variation rates of other adjacent initial video segments, and determining a respective smooth-processed speed variation rates as corresponding final speed variation rate of each initial video segment.

6. The method of claim 1, further comprising, after determining the speed variation rate of the initial video segment:

obtaining an initial speech speed of the initial video segment;

determining a target speech speed of the initial video segment when played based on the speed variation rate, based on the initial speech speed and the speed variation rate of the initial video segment; and if the target speech speed exceeds a predetermined speech speed threshold, adjusting the speed variation rate based on the predetermined speech speed threshold.

7. An electronic device, comprising:

at least one processor and memory; and the memory storing computer-executable instructions;

the computer-executable instructions, when executed by at least one processor, causing the at least one processor to perform acts comprising:

obtaining an initial video segment;

inputting the initial video segment into a machine learning model and determining a speed variation rate of the initial video segment based on an output result of the machine learning model; wherein the machine learning model has been trained based on a sample video segment labeled with the speed variation rate; and varying a speed of the initial video segment based on the speed variation rate to obtain a target video segment, wherein inputting the initial video segment into a machine learning model and determining a speed variation rate of the initial video segment based on an output result of the machine learning model comprises:

extracting a video frame of the initial video segment;

obtaining an evaluation parameter corresponding to the initial video segment by inputting the video frame of the initial video segment into the machine learning model, the evaluation parameter being a parameter for measuring a size of an appropriate speed variation degree of the initial video segment; and determining the speed variation rate of the initial video segment based on the evaluation parameter corresponding to the initial video and a correspondence between a predetermined evaluation parameter and the speed variation rate.

8. The device of claim 7, wherein obtaining an initial video segment comprises:

obtaining an initial video; and obtaining the initial video segment by performing a storyboard-process on the initial video, wherein the initial video segment is a storyboard segment in the initial video.

9. The device of claim 8, further comprising, after obtaining a target video segment:

obtaining a target video by replacing the initial video segment of the initial video with the target video segment.

10. The device of claim 8, wherein obtaining the initial video segment by performing a storyboard-process on the initial video comprises:

obtaining the storyboard segment of the initial video by performing a storyboard-process on the initial video; and dividing the storyboard segment into a plurality of video segments and determining any one of the video segments as the initial video segment.

11. The device of claim 7, further comprising, after obtaining an evaluation parameter corresponding to the initial video segment:

performing a smoothing process on the evaluation parameter corresponding to the initial video segments and evaluation parameters corresponding to other adjacent initial video segments, and determining the respective evaluation parameters after the smoothing process as corresponding final evaluation parameter of each initial video segment; or and the method further comprises, after determining the speed variation rate of the initial video segment:

performing a smoothing process on the speed variation rate of the initial video segment and speed variation rates of other adjacent initial video segments, and determining a respective smooth-processed speed variation rates as corresponding final speed variation rate of each initial video segment.

12. The device of claim 7, further comprising, after determining the speed variation rate of the initial video segment:

obtaining an initial speech speed of the initial video segment;

determining a target speech speed of the initial video segment when played based on the speed variation rate, based on the initial speech speed and the speed variation rate of the initial video segment; and if the target speech speed exceeds a predetermined speech speed threshold, adjusting the speed variation rate based on the predetermined speech speed threshold.

13. A computer program product that, when executed by a processor, performing acts comprising:

obtaining an initial video segment;

inputting the initial video segment into a machine learning model and determining a speed variation rate of the initial video segment based on an output result of the machine learning model; wherein the machine learning model has been trained based on a sample video segment labeled with the speed variation rate; and varying a speed of the initial video segment based on the speed variation rate to obtain a target video segment, wherein inputting the initial video segment into a machine learning model and determining a speed variation rate of the initial video segment based on an output result of the machine learning model comprises:

extracting a video frame of the initial video segment;

obtaining an evaluation parameter corresponding to the initial video segment by inputting the video frame of the initial video segment into the machine learning model, the evaluation parameter being a parameter for measuring a size of an appropriate speed variation degree of the initial video segment; and determining the speed variation rate of the initial video segment based on the evaluation parameter corresponding to the initial video and a correspondence between a predetermined evaluation parameter and the speed variation rate.

14. The computer program product of claim 13, wherein obtaining an initial video segment comprises:

obtaining an initial video; and obtaining the initial video segment by performing a storyboard-process on the initial video, wherein the initial video segment is a storyboard segment in the initial video.

15. The computer program product of claim 14, further comprising, after obtaining a target video segment:

obtaining a target video by replacing the initial video segment of the initial video with the target video segment.

16. The computer program product of claim 14, wherein obtaining the initial video segment by performing a storyboard-process on the initial video comprises:

obtaining the storyboard segment of the initial video by performing a storyboard-process on the initial video; and dividing the storyboard segment into a plurality of video segments and determining any one of the video segments as the initial video segment.

17. The computer program product of claim 13, further comprising, after obtaining an evaluation parameter corresponding to the initial video segment:

performing a smoothing process on the evaluation parameter corresponding to the initial video segments and evaluation parameters corresponding to other adjacent initial video segments, and determining the respective evaluation parameters after the smoothing process as corresponding final evaluation parameter of each initial video segment; or and the method further comprises, after determining the speed variation rate of the initial video segment:

performing a smoothing process on the speed variation rate of the initial video segment and speed variation rates of other adjacent initial video segments, and determining a respective smooth-processed speed variation rates as corresponding final speed variation rate of each initial video segment.

* * * * *